UNITED STATES PATENT OFFICE.

FRANCIS M. IRONMONGER, OF BROOKLYN, NEW YORK.

BLEACHING EDIBLE NUTS.

SPECIFICATION forming part of Letters Patent No. 386,202, dated July 17, 1888.

Application filed December 24, 1887. Serial No. 258,911. (No specimens.)

*To all whom it may concern:*

Be it known that I, FRANCIS M. IRONMONGER, a citizen of the United States, residing at No. 103 Cambridge Place, Brooklyn, in the county of Kings and State of New York, have invented certain new and useful Improvements in Processes of Bleaching Edible Nuts; and I do hereby declare that the following is a full, clear, and exact description of the invention, which will enable others skilled in the art to which it appertains to make and use the same.

This invention is an improvement on the process covered by my patent, No. 126,550, dated May 7, 1872, and has relation to the cleaning and improving of the shells of edible nuts; and it consists in the following-described process: Make a solution as follows: First, dissolve one part of tartaric acid in two parts of hot or cold water; second, dissolve one-ninth part of oxalic acid in one part of hot or cold water; third, incorporate the two solutions by pouring one into the other and stirring, thereby making a mixture of tartaric and oxalic acids. If the tartaric acid is strictly pure, the above solution will be found to give quick results in the brightening and improving of the shells of the nuts, and for the purpose of economy more water may be added to the incorporated solution, or to either the tartaric or oxalic acids before incorporation, and will give satisfactory results. Immerse the nuts in the solution and allow them to remain long enough to change the color of the shells satisfactorily—say five to thirty minutes, according to the strength of the solution and the nature of the shells operated on. Then separate the nuts from the solution, after which wash them well in clear water to remove the solution that will be left on the shells. Then separate the nuts from the water and dry them by exposure or artificial heat, after which they are ready to be packed.

This process is designed to clean and improve edible nuts, in order to render them more attractive, and thereby more valuable, as nuts of good quality and dark shells are less sought after than those having clean and light shells.

My process renders the nuts clean, bright, and attractive in color and makes them as marketable as those having naturally bright shells.

Having fully described my invention, what I desire to claim and secure by Letters Patent is—

The process of bleaching and improving edible nuts, as described, consisting in subjecting the nuts to a bath of a mixture of tartaric and oxalic acids and then drying them, all substantially as described.

FRANCIS M. IRONMONGER.

Witnesses:
CHAS. I. MALONE,
A. J. HARTMAN.